(12) United States Patent
Rothenhauser

(10) Patent No.: US 9,587,850 B2
(45) Date of Patent: Mar. 7, 2017

(54) HVAC TEMPERATURE STRATIFICATION IMPROVEMENT TECHNIQUE

(75) Inventor: Alex Rothenhauser, Redford Township, MI (US)

(73) Assignees: DENSO CORPORATION, Kariya (JP); DENSO International America, Inc., Southfield, MI (US)

( * ) Notice: Subject to any disclaimer, the term of this patent is extended or adjusted under 35 U.S.C. 154(b) by 1034 days.

(21) Appl. No.: 13/475,126

(22) Filed: May 18, 2012

(65) Prior Publication Data

US 2013/0306298 A1 Nov. 21, 2013

(51) Int. Cl.
| | |
|---|---|
| *B60H 1/24* | (2006.01) |
| *F24F 13/14* | (2006.01) |
| *B60H 1/00* | (2006.01) |
| *F24F 7/00* | (2006.01) |

(52) U.S. Cl.
CPC ......... *F24F 13/14* (2013.01); *B60H 1/00678* (2013.01); *B60H 2001/00721* (2013.01); *F24F 2007/004* (2013.01)

(58) Field of Classification Search
CPC ............ B60H 1/00671; B60H 1/00678; B60H 2001/00721; F24F 2007/004; F24F 13/14
USPC ......... 454/156, 160, 161; 165/202, 204, 212
See application file for complete search history.

(56) References Cited

U.S. PATENT DOCUMENTS

| | | | | |
|---|---|---|---|---|
| 4,616,693 A | * | 10/1986 | Dietzsch et al. | 165/41 |
| 5,305,823 A | * | 4/1994 | Elliot | 165/41 |
| 5,857,905 A | * | 1/1999 | Uemura et al. | 454/121 |
| 6,019,163 A | | 2/2000 | Saido et al. | |
| 6,386,966 B1 | * | 5/2002 | Kuwayama et al. | 454/139 |
| 6,579,167 B1 | | 6/2003 | Demeniuk | |
| 6,991,027 B2 | * | 1/2006 | Ozeki et al. | 165/203 |
| 7,101,278 B2 | | 9/2006 | Sikorski et al. | |
| 7,563,159 B2 | | 7/2009 | Newman et al. | |
| 2007/0293135 A1 | | 12/2007 | Hori et al. | |
| 2010/0130115 A1 | * | 5/2010 | Miki | 454/155 |

FOREIGN PATENT DOCUMENTS

| | | |
|---|---|---|
| DE | 19842875 B4 | 4/1999 |
| DE | 102007026620 A1 | 12/2007 |
| JP | 2001-219729 A | 8/2001 |

OTHER PUBLICATIONS

Office Action issued May 22, 2014 in corresponding DE Application No. 10 2013 104 619.3 (with English translation).
Office Action issued Feb. 2, 2015 in corresponding CN Application No. 2013 1016 2811.7 (with English translation).

* cited by examiner

*Primary Examiner* — Gregory Huson
*Assistant Examiner* — Dana Tighe

(57) ABSTRACT

An air distribution door for use in a ventilation system with anti-stratification feature is provided. The door includes a tab extending from the main body of the door. The tab partially disrupts air flow going into the heat exchanger. This disruption slows high velocity airflow going across the heat exchanger and causes a more uniform thermal transfer distribution to the air from the heat exchanger, which provides preferred comfort by the user.

10 Claims, 5 Drawing Sheets

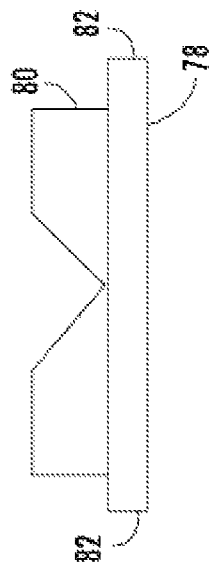
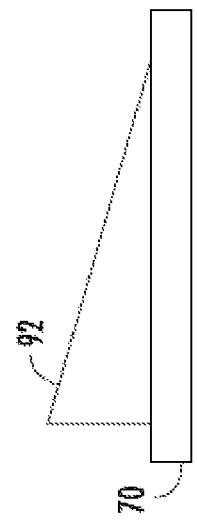
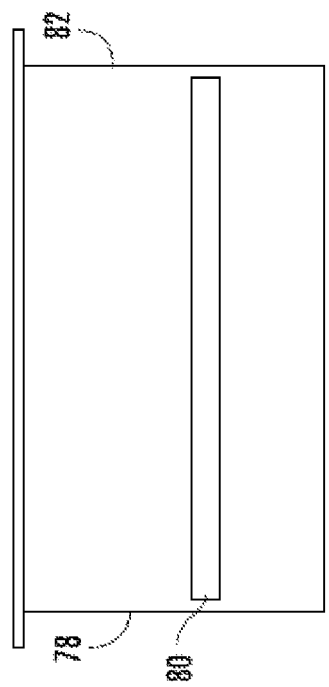
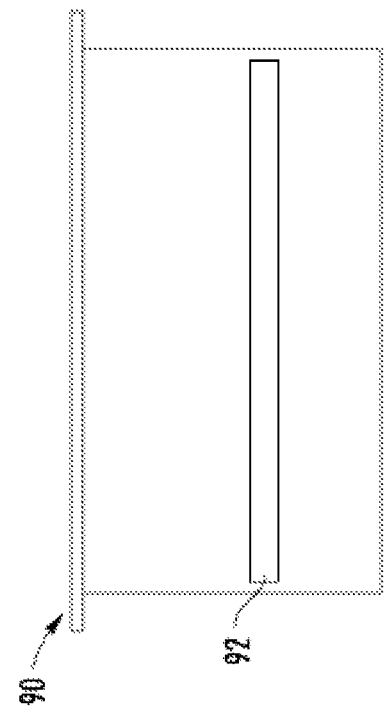

HVAC TEMPERATURE STRATIFICATION IMPROVEMENT TECHNIQUE

FIELD

This present invention relates to the field of automotive heating ventilating and air conditioning systems, more specifically this invention relates to the air distribution door that directs air flow to a heat exchanger.

BACKGROUND

This section provides background information related to the present disclosure which is not necessarily prior art.

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that incorporates an evaporator for absorbing heat from the warm air in the cabin and from the outside environment. The heater core and evaporator are typically provided in an HVAC housing located in the passenger compartment of the vehicle. The evaporator and heater core are generally disposed downstream of a fan for communicating cooled or warmed air into the passenger compartment.

Distribution or control or blend air doors within an HVAC unit are used to control the various airflows through the heat exchangers. When a "full hot" condition is required, the air doors shut off airflow from non-heated air sources. Conversely, when a "full cold" condition is required, the air doors shut off airflow from the heated air source. In "medium mode" conditions, when temperature other than "full hot" or "full cold" is required, the air doors may be positioned to allow heated and non-heated air streams, in varying degrees, to pass through the HVAC unit.

The air output from the HVAC unit may be supplied directly to various outlets within the vehicle cabin. It is desirable to be able to provide air through the outlets simultaneously which are all at substantially similar temperatures A heater core typically does not produce uniform temperature distribution across its plane. As a result, a temperature gradient is observed along the heater core. With a typical HVAC configuration, sometimes an undesirable temperature imbalance is observed between the center and outside panel vents in the cabin of the vehicle, known in the art as stratification. Conventional methods to compensate for the temperature imbalance are to increase tank depth of the heater core, increase thickness of the heater core, or shift the position of the heater core inside the case. All of these options involve costly tooling changes and can have a negative impact in terms of airflow volume and noise.

SUMMARY

This section provides a general summary of the disclosure, and is not a comprehensive disclosure of its full scope or all of its features.

An air distribution door for use in a ventilation unit which aids in preventing stratification comprises that includes a main body of the door that rotates on an axis to block a predetermined amount of air distributed through the ventilation unit. The door contains a tab that extends perpendicular from the distribution door main body. The tab may be of rectangular shape and may be formed into the control door. The height of the tab may be constant and determined based on specific performance requirements of the ventilation unit. The position of the tab may be parallel to the rotation axis of the door.

In another form, the present disclosure provides an automotive heating, ventilating and cooling system including a blower fan, a evaporator to cool air, a heater core to increase the temperature of the air, a distribution door, which rotates on an axis, placed between the two heat exchangers to divert some of the airflow through the heater core. The distribution door has a tab protruding from the body of the door. There may be more than one distribution door with a protruding tab in the ventilation system. The protruding tab may be placed on the heater core side of the distribution door. The protruding tab may vary in height depending on the application of the automotive ventilation system. The angle of the protruding tab to the axis of the door may be predetermined based on the performance of the automotive ventilation system. The protruding tab location on the plane of the distribution door may be predetermined based on the performance of the automotive ventilation system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The drawings described herein are for illustrative purposes only of selected embodiments and not all possible implementations, and are not intended to limit the scope of the present disclosure.

FIG. 6 is another perspective view of the air distribution door with air disruption tab in the HVAC module assembly FIG. 7. is another perspective view of the air distribution door with air disruption tab in the HVAC module assembly;

Corresponding reference numerals indicate corresponding parts throughout the several views of the drawings.

DETAILED DESCRIPTION

Figure 1:
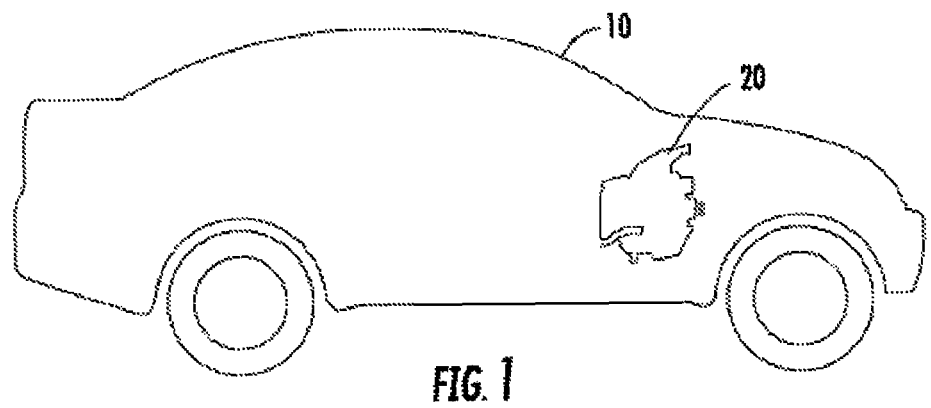
FIG. 1 is a schematic representation of a vehicle having a heating, ventilating and cooling system according to the principles of the present disclosure.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Figure 2:
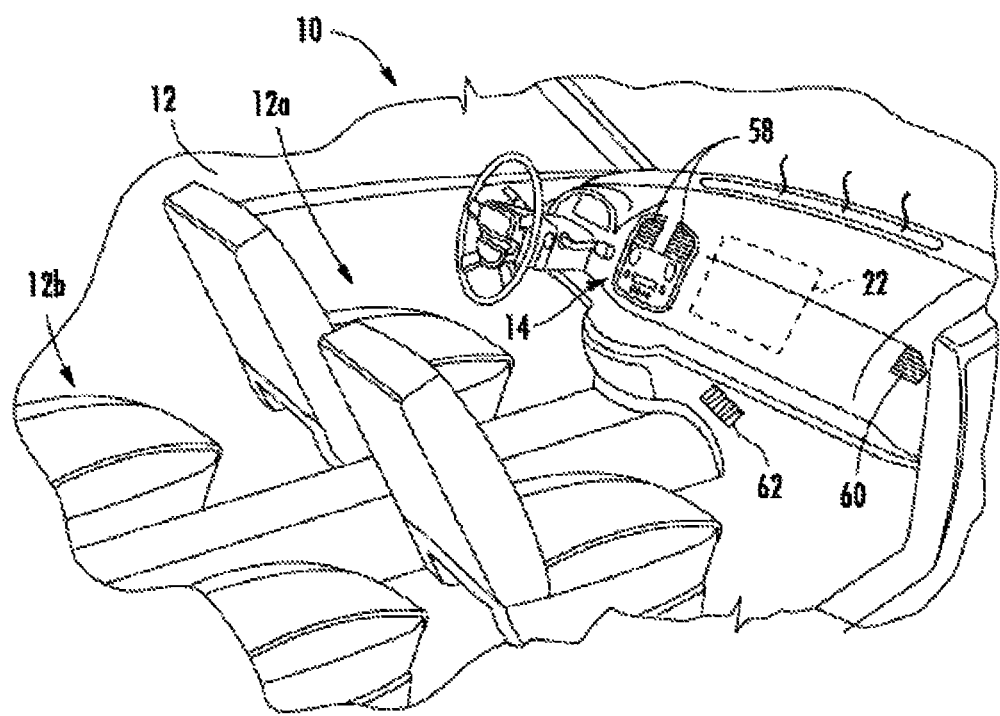
FIG. 2 is a fragmented perspective view of an automotive vehicle showing a portion of the passenger space.

Referring to FIGS. 1 & 2, an automotive vehicle 10 with an HVAC system 20 within which an HVAC module 22 according to the present teachings can be utilized is shown. Vehicle 10 includes a passenger space 12 which may have both a front passenger space 12a and a rear passenger space 12b. HVAC controls 14 allow adjustment of the operation of HVAC module 22 to provide desired flows of conditioned air.

Figure 3A:
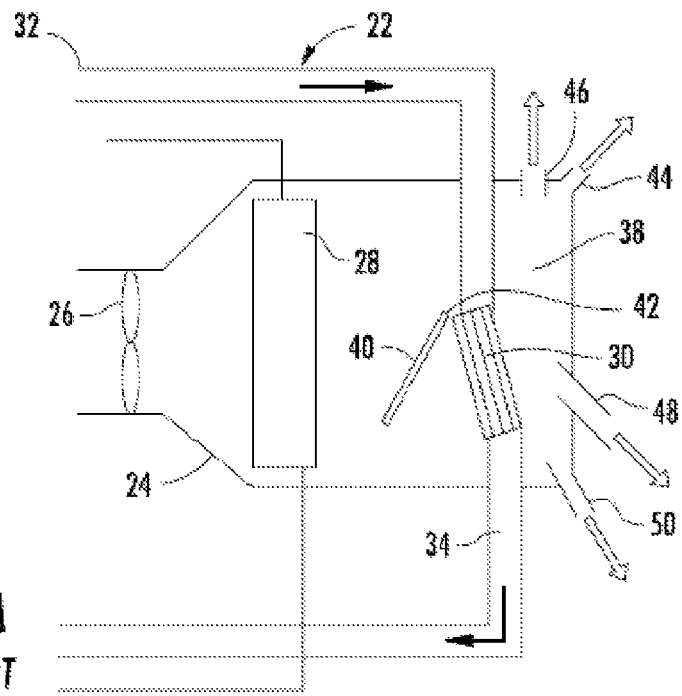
FIG. 3A is a simplified view of an HVAC module.

With reference to FIG. 3A, a block diagram of a conventional vehicle HVAC module 22 is shown and generally identified at reference 22. An HVAC case 24 forms a ventilation duct through which air conditioned and/or heated air is sent into the passenger compartment 12. The HVAC case 24 contains a fan 26 which is arranged on the upstream side of an evaporator 28. Low pressure refrigerant flowing into the evaporator 28 absorbs heat from the air inside the HVAC case 24 for evaporation. The HVAC case 24 accommodates, on the downstream side of the evaporator 28, a hot water heater core (heat exchanger) 30. The heater core 30 includes an inlet pipe 32 and an outlet pipe 34. Hot water (coolant) of the vehicle engine (not shown) is directed to the heater core 30 through the inlet pipe 32 by a water pump (not shown).

An air bypass channel 38 is formed beside the hot water heater core 30. An air distribution door 40 is provided to adjust the volume ratio between warm air and cool air that passes through the hot water heater core 30 and the bypass channel 38, respectively. The air distribution door 40 adjusts the temperature of the air blown into the passenger compartment 12 by adjusting the volume ratio between the warm air and the cool air. The door rotates on an axis 42 to adjust the volume ratio.

Additionally, a face outlet 44, a defroster outlet 46, a foot outlet 48 and a rear cabin outlet 50 are formed at the downstream end of the HVAC case 24. The face outlet 44 directs air toward the upper body portions of passengers, the defroster outlet 46 directs air toward the internal surface of a windshield, the foot outlet 48 directs air toward the feet of the front seat passengers, and the rear cabin outlet 50 directs air toward the rear seat passengers of the vehicle. The outlets 44, 46, 48, 50 are opened and closed by outlet mode doors (not shown). The air distribution door 40 rotates on an axis 42 and is driven by such electric driving devices such as servo motors via linkages, cables via linkages or the like (not shown).

Figure 4:
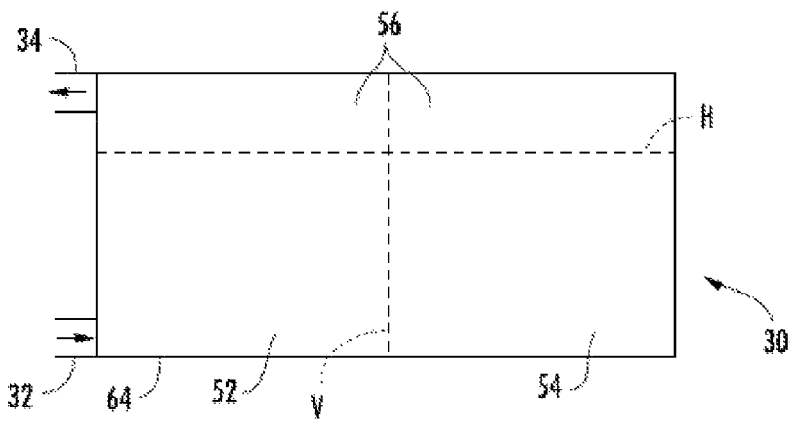
FIG. 4 is a simplified view of an HVAC module heater core.

In order to appreciate the advantages realized by the tab 64 extending from the air distribution door 41 of the present invention described herein, a discussion of the operation of the heater core 30 is warranted. With additional reference now to FIG. 4, a diagrammatic representation of the heater core 30 is shown. At the outset dashed line 'V' represents the vertical orientation of the heater core 30. In this regard, line V represents a division in the downstream air from the heater core 30 between the driver side region 52 and the passenger side region 54 (for dual zone HVAC configuration) A horizontal dashed line 'H' represents a upper zone 56 aligned for directing air to the face outlet 44 direct at the front passenger occupants, the area of the heater core closer to the V line represents the zone of air that gets directed to the center vents 58, the area closer to the outer edge of the heater core represents a zone that the air gets directed to the outer front vents 60. The area closer to the bottom edge 64 of the heater core 30, represents the zone aligned for directing air toward the foot outlet 48 and foot vent 62 in passenger cabin 12.

To further appreciate the advantages realized by the current teachings, operation of an HVAC module without a tab 64 on the air distribution door is warranted. The air distribution door 40 in the current art does not have a tab 64 extending from the body of the door. However, without the tab 64 on the air distribution door the heater core may exhibit hot and cold areas which lead to inconsistent panel out temperatures at the vents 58, 60, leading into the passenger space 12. The hot and cold areas on the heater core 30 are caused by the velocity of the air moving across the heater core 30. The areas of the heater core 30 where the air velocity is high are cooler; subsequently areas of the heater core 30 with lower air velocity flowing over it are warmer. It can be appreciated that areas of higher velocity air on the heater core 30 can change by configuration of the HVAC case 22, downstream ducts 44,46,48,50, and heater core 30 orientations. Based on the current configuration of the HVAC case 22, stratification between front center vents 58 and outer front vents 60 was exhibited. The current configuration in a full hot mode (air distribution door 40 directing 100% of air through heater core 30), without the tab on the air distribution door, caused front passenger panel center vents 58 temperatures to be hotter than the outer front vents 60. The heater core 30 experience higher velocity air flowing over the upper outer zone area 56, causing the heater core 30 to be cooler in that area. The present teachings are to incorporate a tab on the air distribution door 40 to disrupt the high velocity air flowing over the heater core 30, specifically in the upper zone of the heater core.

Figure 3B:
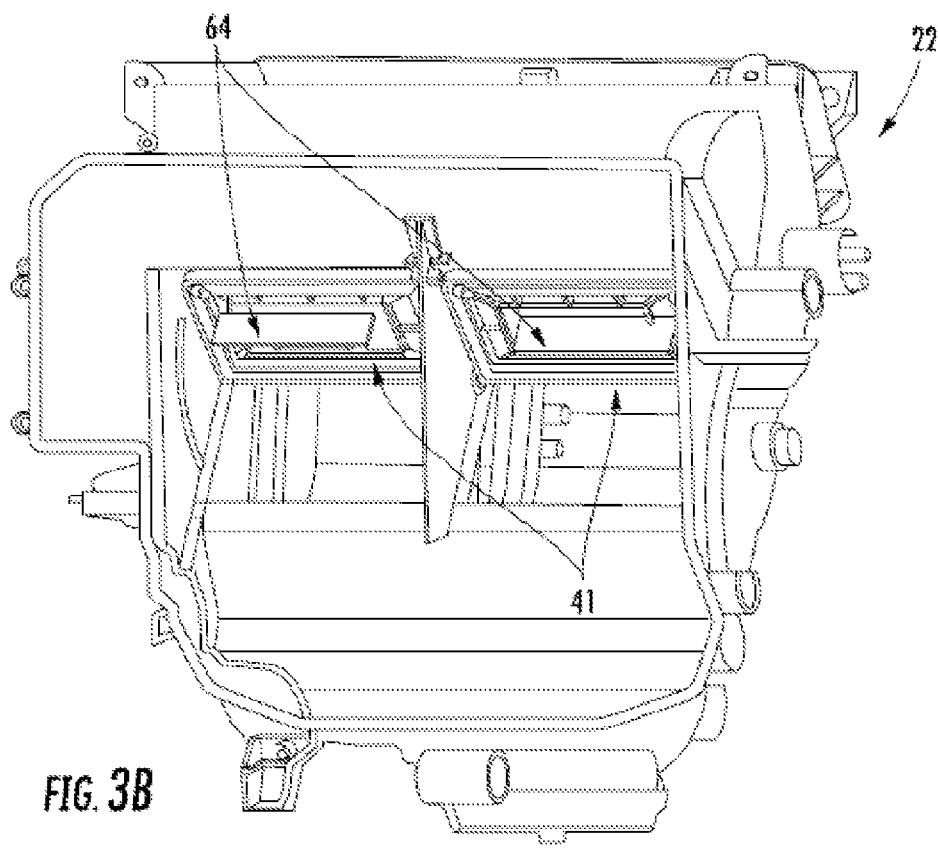
FIG. 3B is a view of the preferred embodiment HVAC module.
Figure 5:
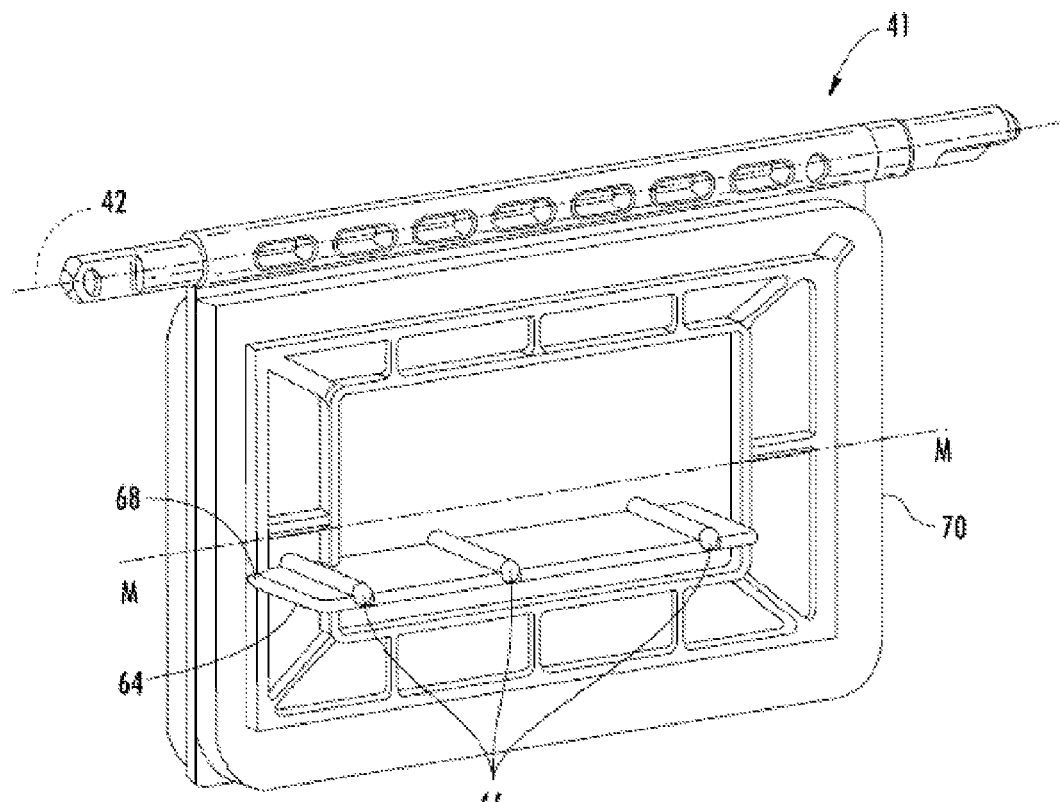
FIG. 5 is a perspective view of the air distribution door in the HVAC module assembly.

As illustrated in FIG. 3B, the preferred embodiment maintains two air distribution doors 41; this is to allow for a dual front zone configuration by way of non-limiting example. It can be appreciated that the tab 64 can be incorporated on HVAC units that maintain single zone, dual zone, and tri zone, with a multitude arrangement of air distribution doors. Referring to FIG. 5, the preferred embodiment teaches of a tab 64 on the air distribution door 41 is rectangular in cross section shape and positioned distally from the midway point 'M' from the axis. The tab 64 may contain rib sections 66 to provide added strength or stiffness, by way of non-limiting example. The tab starts at the door outboard sealing side 68 and spans toward the inboard side 70 of the door 41, the tab 64 spans approximately three-quarters the width of the door 41, with a height of approximately one-third the height of the door 41. It can be appreciated in the art that the downstream configuration can have an effect on the temperature gradient of the heater core 30. In the preferred embodiment it was discovered that the duct length has an effect to the velocity of air and ultimately the output temperature at the vent leading to the passenger space 12. In the current configuration the path leading to the center vents 58 is shorter than the ducting leading to outside passenger vents 60. This was causing stratification between the center vents 58 and outer vents 60 leading into the passenger space 12. The temperature of air coming out of the outer vents 60 was found to be colder, in the full hot position, than the center vents 58. To counter this stratification issue the tab 64 does not span the entire width of the door 41. The tab spans approximately three-quarters of the width of the door leaving an opening near inboard side 70 of the door that is associated with the center V line of the heater core 30, shown in FIG. 4. While air passes over the door and tab, the higher velocity air is allowed to flow through the center of the upper zone 56 of the heater core 30 which is the zone associated with the center vents 58 eliminating the stratification and balancing the outlet temperature of vents 58, 60 leading into the passenger space 12. The height of the tab 64 is determined on understanding the zones of the heater core 30 that lead to related vents. In the current configuration, to fully disrupt the high velocity air in the upper zone 56 of the heater core 30, and balance the vents 58 and 60 outlet temperature, it was determined to have the tab 64 be approximately one-third the height of the door 41, by way of non-limiting example. It can be appreciated that there are several ways in the art to determine hot and cold areas of the heater core 30; one potential method is to equip the heater core 30 with a grid of thermal couples (not shown) and perform various evaluations to determine the temperature differences across the heater core 30. Another potential method is to simulate air velocity vectors using computer simulation software and determine the hot and cold areas. No matter which method is used, it is appreciated that the tab 64 will be placed to disrupt air flowing through the higher velocity areas of the heater core 30.

It may be further appreciated that the tab 64 may be integrally molded with the door 41, thus making it the same material as the door 41 such as, a synthetic polymer, by way of non-limiting example. The tab 64 may also be of different material than the door 41 and attached to the door 41 with an adhesive (not shown). The tab 64 may also be the same material as the door 41 and attached to the air distribution door 41 with an adhesive (not shown), by way of non-limiting example.

Figure 8B:
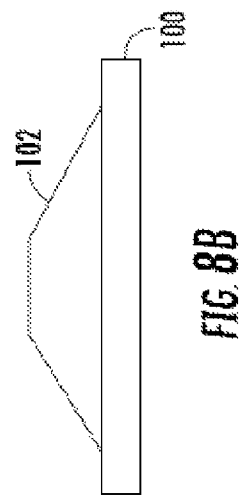
FIG. 8 is another perspective view of the air distribution door with air disruption tab in the HVAC module assembly.
Figure 8A:
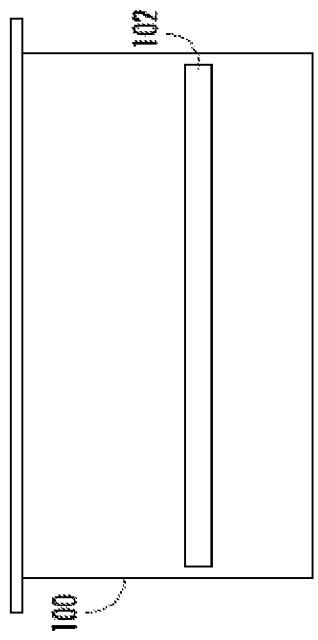

Referring now to FIGS. 6-8, the tab 64 on the air distribution door 41 can take a variety of forms, shapes, and orientation to provide the described functionality, and depending on the stratification of the particular HVAC unit, duct and panel out vent configuration. For example in FIGS. 6A and B; an air distribution door 78 with an air disruption tab 80 which has general "V" shape to disrupt air on the outer edges 82 of the door 78 but allow high velocity air over the middle of the door 78. In other embodiments, referring to FIGS. 7A and B, an air distribution door 90 contains an air disruption tab 92 that has a linear angle triangular shape. In yet another embodiment, referring to FIG. 8, an air distribution door 100 contains an air disruption tab 102 that has a triangular plateau shape with a raised portion in the middle of the door 100, by way of non-limiting example.

It can be appreciated that the air disruption tab 64 may be placed anywhere on the door 41 that allows for the appropriate clearances to open and close the air distribution door 41. The tab can span across the air distribution door from a small segment of the width of the door 41, to the full width of the door 41 depending on desired function. The height of the tab 64 may be at least a fraction of the height of the opening leading into the heater core 30, and may be less than three quarters of the height of the opening leading into the heater core 30. It will be appreciated that the tab may be otherwise suitably formed, shaped, relatively oriented and/or located.

Figure 9B:
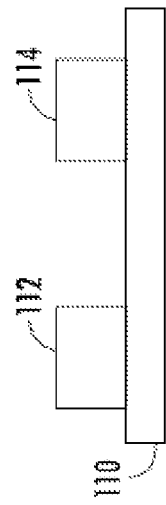
FIG. 9 is another perspective view of the air distribution door with two air disruption tabs in the HVAC module assembly.
Figure 9A:
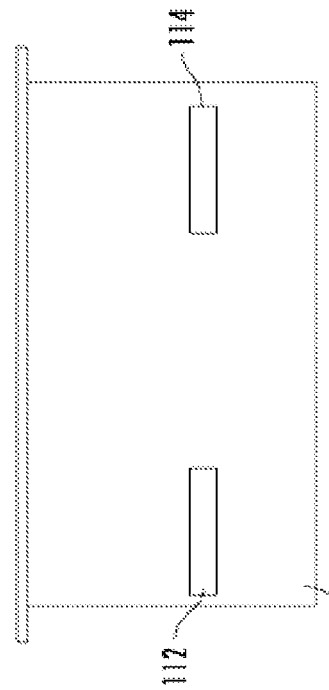

Referring to FIG. 9: additionally or alternatively, the air distribution door 110 could include two or more separate tabs 112, 114. For example, the vehicle 10 may include a dual or multiple zone climate control system, where a driver and one or more passengers may adjust temperature settings and/or airflow quantity settings for a localized zone within the passenger compartment of the vehicle 12. In such an embodiment, each of the air distribution doors 110 may correspond to one of the multiple localized zones within the vehicle passenger area 12. These differing configurations may cause the temperature gradient of the heater core 30 to be in different zones on the heater core based on the velocity of air passing over the heater core 30. Multiple tabs 64 may be incorporated on the air distribution door 110 to disrupt air flow and allow higher velocity air to pass over the heater depending on balance needed of the vents 58, 60, 62 leading into the passenger space 12.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An automotive ventilation system comprising:
    a blower fan that generates an airflow;
    a first heat exchanger to reduce temperature of air;
    a second heat exchanger to increase the temperature of the air;
    a plurality of center face vents downstream of the second heat exchanger;
    a plurality of outer face vents downstream of the second heat exchanger; and
    at least one distribution door comprising a planar body, positioned between the first heat exchanger and the second heat exchanger for forcibly diverting at least a portion of airflow through the first and second heat exchanger; the at least one distribution door rotates on an axis, adjacent to the axis the at least one distribution door has an outboard side, opposite the outboard side at a width is a inboard side;
    wherein the at least one distribution door has a tab protruding from the planar body of the at least one distribution door, the tab spanning from the outboard side toward the inboard side at a length, the length of the tab is smaller than a width of the distribution door; wherein the airflow that flows across the inboard side of the at least one distribution door primarily flows to the center face vents, the airflow that flows across the outboard side of the at least one distribution door is disrupted by the tab and primarily flows to the outer face vents.

2. The automotive ventilation system according to claim 1, wherein the system contains two symmetrical distribution doors.

3. The automotive ventilation system according to claim 1, wherein the tab cross-section is substantially rectangular shaped.

4. The automotive ventilation system according to claim 1, wherein the tab is located on the second heat exchanger side of the at least one distribution door.

5. The automotive ventilation system according to claim 1, wherein the height of the tab varies across the length of the tab.

6. The automotive ventilation system according to claim 1, wherein the tab is located parallel to a rotation axis.

7. The automotive ventilation system according to claim 1, wherein the length of the tab is three-quarters the width of the distribution door.

8. A vehicle HVAC system comprising:
a HVAC case;
an evaporator in the HVAC case, the evaporator having a upstream side and a downstream side;
a blower located upstream of the evaporator in the HVAC case, the blower generating an airflow;
a heater core located downstream of the evaporator in the HVAC case;
a plurality of ducts attached to the HVAC case located downstream of the heater core, attached to the plurality of ducts is at least a plurality of center face vents and outer face vents;
a bypass channel located adjacent to the heater core; and
at least two planar body air distribution doors located between the heater core and evaporator that distribute air from the evaporator to the heater core or bypass channel; the at least two planar body air distribution doors rotate on an axis, adjacent to the axis the at least two planar body air distribution doors have an outboard side, opposite the outboard side at a width is a inboard side, the inboard side is adjacent to a center of the heater core;
wherein the at least two planar body air distribution doors each have a tab protruding from the planar body, the tab spanning from the outboard side toward the inboard side at a length smaller than a width of the air distribution doors, the tab disrupts the airflow on the outboard side and allows a higher velocity airflow over the inboard side, wherein the higher velocity airflow that flows over the inboard side of the two planar body air distribution doors primarily flows to the center face vents, the airflow that flows across the outboard side of the two planar body air distribution doors is disrupted by the tab and primarily flows to the outer face vents.

9. The HVAC system according to claim 8, wherein the length of the tab is three-quarters the width of the door.

10. A dual zone vehicle HVAC system comprising:
a HVAC case;
a blower fan;
an evaporator located downstream of the blower fan;
a heater core located downstream of the evaporator;
a plurality of face and foot outlets attached to the HVAC case located downstream of the heater core, wherein the face outlets are a plurality of center vents and outer vents; the face and foot outlets are divided into two zones;
a bypass channel located adjacent to the heater core; and
two planar body air distribution doors located between the heater core and evaporator that distribute air from the evaporator to the heater core or bypass channel; the two planar body air distribution doors rotate on an axis, adjacent to the axis the two planar body air distribution doors have an outboard side, opposite the outboard side at a width is a inboard side, the inboard side is adjacent to a center of the heater core;
wherein the two planar body air distribution doors each have a tab, the tab extends perpendicular from the planar body spanning from the outboard side toward the inboard side at a length three quarters a width of the planar body air distribution doors allowing high velocity airflow to flow through a first zone of the heater core that leads to the center vents and disrupting the airflow causing a lower velocity airflow through a second zone of the heater core that leads to the outer vents.

* * * * *